United States Patent
Tanaka

(10) Patent No.: US 12,421,057 B2
(45) Date of Patent: Sep. 23, 2025

(54) LINEAR CONVEYING DEVICE AND CONTROL METHOD THEREOF

(71) Applicant: KYOTO SEISAKUSHO CO., LTD., Kyoto (JP)

(72) Inventor: Atsushi Tanaka, Kyoto (JP)

(73) Assignee: Kyoto Seisakusho Co., Ltd., Kyoto (JP)

( * ) Notice: Subject to any disclaimer, the term of this patent is extended or adjusted under 35 U.S.C. 154(b) by 123 days.

(21) Appl. No.: 18/552,698

(22) PCT Filed: Mar. 15, 2022

(86) PCT No.: PCT/JP2022/011473
§ 371 (c)(1),
(2) Date: Sep. 27, 2023

(87) PCT Pub. No.: WO2022/209837
PCT Pub. Date: Oct. 6, 2022

(65) Prior Publication Data
US 2024/0174460 A1    May 30, 2024

(30) Foreign Application Priority Data
Mar. 29, 2021  (JP) .................................. 2021-055164

(51) Int. Cl.
| | | |
|---|---|---|
| *B65G 54/02* | (2006.01) | |
| *B65G 43/02* | (2006.01) | |
| *H02K 41/02* | (2006.01) | |
| *H02K 41/03* | (2006.01) | |

(52) U.S. Cl.
CPC ............. *B65G 54/02* (2013.01); *B65G 43/02* (2013.01); *H02K 41/03* (2013.01); *H02K 41/02* (2013.01)

(58) Field of Classification Search
CPC .... H02K 41/03; H02K 41/031; H02K 41/025; B65G 54/02; B65G 43/02
USPC .................................................. 198/619, 805
See application file for complete search history.

(56) References Cited

U.S. PATENT DOCUMENTS

| | | | |
|---|---|---|---|
| 11,186,443 B2 * | 11/2021 | Boarin .................... | B65G 47/28 |
| 2016/0207658 A1 * | 7/2016 | Bellante .................. | B65B 35/10 |
| 2016/0297619 A1 * | 10/2016 | Hahn .................... | B65G 47/846 |
| 2019/0047799 A1 * | 2/2019 | Spotti ............... | H01L 21/67709 |

FOREIGN PATENT DOCUMENTS

| | | | | |
|---|---|---|---|---|
| JP | 2015-525176 A | | 9/2015 | |
| JP | 2019099385 A | * | 6/2019 | ......... B65G 21/2054 |
| WO | WO-2019129394 A1 | * | 7/2019 | ............. B65B 31/02 |

OTHER PUBLICATIONS

International Search Report (with partial translation) dated May 31, 2022, issued in corresponding International Patent Application No. PCT/JP2022/011473.

* cited by examiner

*Primary Examiner* — James R Bidwell
(74) *Attorney, Agent, or Firm* — Morgan, Lewis & Bockius LLP

(57) ABSTRACT

In a linear conveying device for conveying articles with a linear motor, of a plurality of shuttles, at least two are combined together to form a first operating group. In the first operating group, one of the shuttles in it is taken as a first master shuttle, and any other is taken as a first slave shuttle. The first master shuttle is controlled based on its position on the guide portion. The first slave shuttle is controlled based on its relative position from the first master shuttle.

7 Claims, 7 Drawing Sheets

LINEAR CONVEYING DEVICE AND CONTROL METHOD THEREOF

TECHNICAL FIELD

The present invention relates to a linear conveying device for conveying articles using a linear motor and a method of controlling such a linear conveying device.

BACKGROUND ART

Japanese Unexamined Patent Application Publication No. 2015-525176 (a translated PCT Application) discloses, as a device for conveying articles, a linear conveying device using a linear motor. The linear conveying device includes a stator of a linear motor with electromagnets arranged in it and a conveying member including a permanent magnet. The electromagnet and the permanent magnet constitute a linear motor system. The conveying member includes holders or handling holders, and moving products held by the holders or handling holders arrayed in a conveying direction allows the conveyance of the products.

CITATION LIST

Patent Literature

Patent Document 1: Japanese Patent Application published as No. 2015-525176.

SUMMARY OF INVENTION

Technical Problem

Conventional linear conveying devices controls conveying members individually; thus, as the number of conveying member increases, processing tends to become complicated. Complicated processing is prone to delays, which can cause conveying members to collide with each other.

Thus, an object of the present invention is to provide a linear conveying device that can, with simple processing, prevent collision between a plurality of shuttles.

Solution to Problem

To achieve the above object, a linear conveying device according to the present invention conveys articles with a linear motor. The linear conveying device includes: a guide portion on which a stator of the linear motor is arranged; a plurality of shuttles that are attached to the guide portion, each moving along the guide portion while holding an article, each having a mover of the linear motor arranged on it; and a controller for controlling the operation of the plurality of shuttles. Of the plurality of shuttles, at least two shuttles are combined together to form a first operating group. In the first operating group, one of the shuttles in it is taken as a first master shuttle and any other is taken as a first slave shuttle. The first master shuttle is controlled based on its position on the guide portion, and the first slave shuttle is controlled based on its relative position from the first master shuttle.

With this configuration, even when there are a plurality of shuttles, it is possible to control them, with simple processing, along the guide portion while preventing collision between them. The controller can take some shuttles as slave shuttles and control them based on their relative distances from a master shuttle; thus, it is possible to effectively prevent collision between shuttles.

In the configuration described above, the linear conveying device may include a plurality of (i−1)th (where i is any integer of two or more) operating groups. The (i−1)th operating groups may each include one (i−1)th master shuttle and one or a plurality of (i−1)th slave shuttles. The (i−1)th slave shuttles may be controlled based on their relative positions from the (i−1)th master shuttle. Of the plurality of (i−1)th operating groups, at least two (i−1)th operating groups may be combined together to form an i-th operating group. Of the plurality of (i−1)th master shuttles, one may be taken as an i-th master shuttle and any other may be taken as an i-th slave shuttle. While control of the relative positions of the (i−1)th slave shuttles from the (i−1)th master shuttle is maintained, the i-th master shuttle may be controlled based on its position on the guide portion, and the i-th slave shuttle may be controlled based on its relative position from the i-th master shuttle.

In the configuration described above, the linear conveying device may include a plurality of operating groups of the (i−1)th (where i is any integer of two or more) and subsequent orders. The slave shuttles of the (i−1)th and subsequent orders may be controlled based on their relative positions from the master shuttles of the same orders. Of the operating groups or the single shuttles of the (i−1)th (where i is any integer of two or more) and subsequent orders, at least two may be combined together to form an i-th operating group. Of the plurality of master shuttles or the single shuttles of the (i−1)th and subsequent orders, one may be taken as an i-th master shuttle and any other is taken as an i-th slave shuttle. While control of the relative positions of the slave shuttles of the (i−1)th and subsequent orders from the master shuttles of the same orders is maintained, the i-th master shuttle may controlled based on its position on the guide portion, and the i-th slave shuttle may be controlled in terms of its relative position from the i-th master shuttle.

In the configuration described above, the relative position of a k-th (where k is any integer of one or more) slave shuttle from a k-th master shuttle may change depending on the position of the k-th master shuttle on the guide portion.

In the configuration described above, a combination of k-th (where k is any integer of one or more) operating groups may be broken up according to the position of the k-th master shuttle on the guide portion.

Advantageous Effects of Invention

A linear conveying device according to the present invention can, with simple processing, prevent collision between a plurality of shuttles.

DESCRIPTION OF EMBODIMENTS

Figure 1:
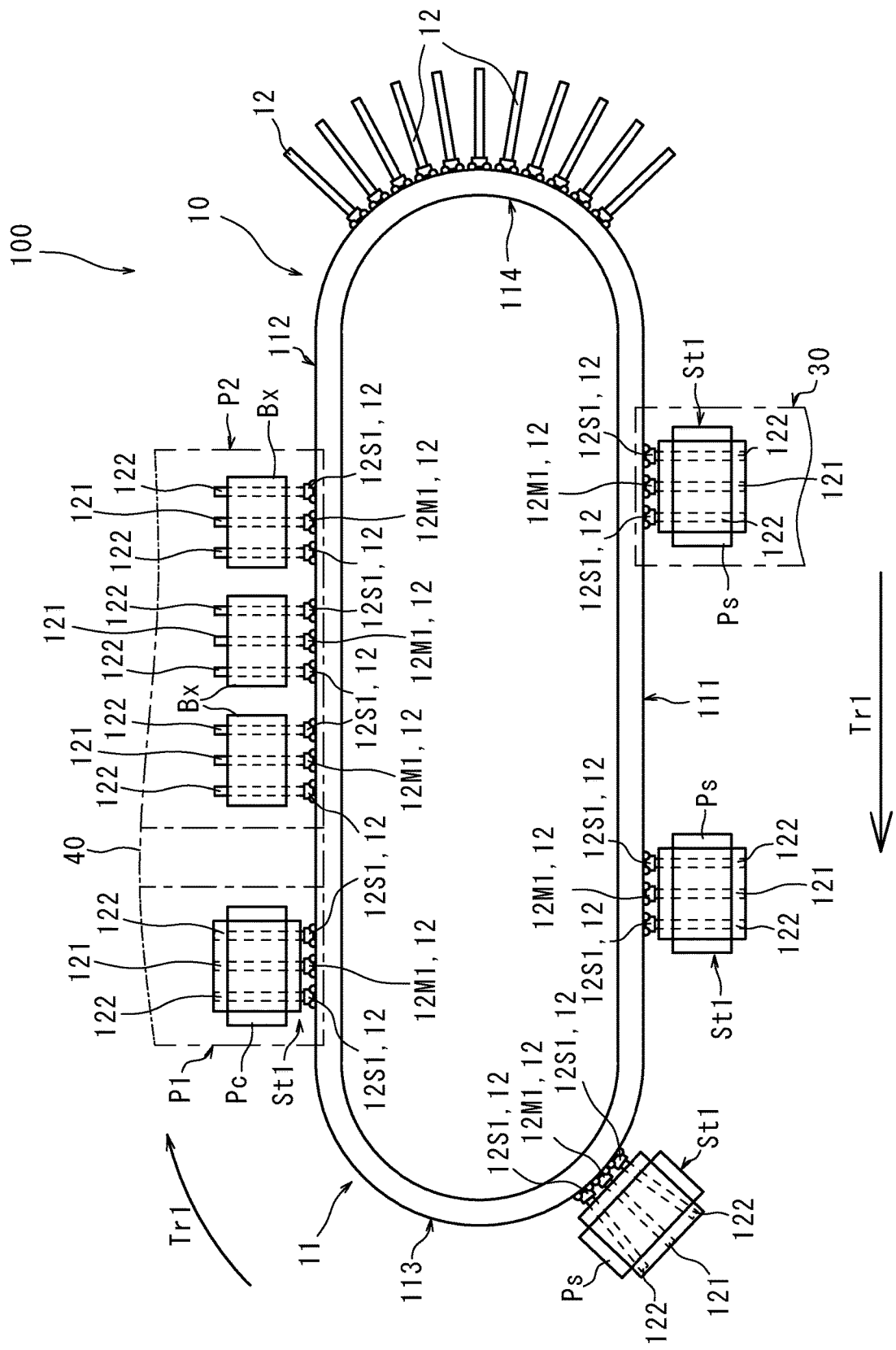
FIG. 1 is a schematic diagram of a working apparatus using a linear conveying device according to the present invention.
Figure 2:
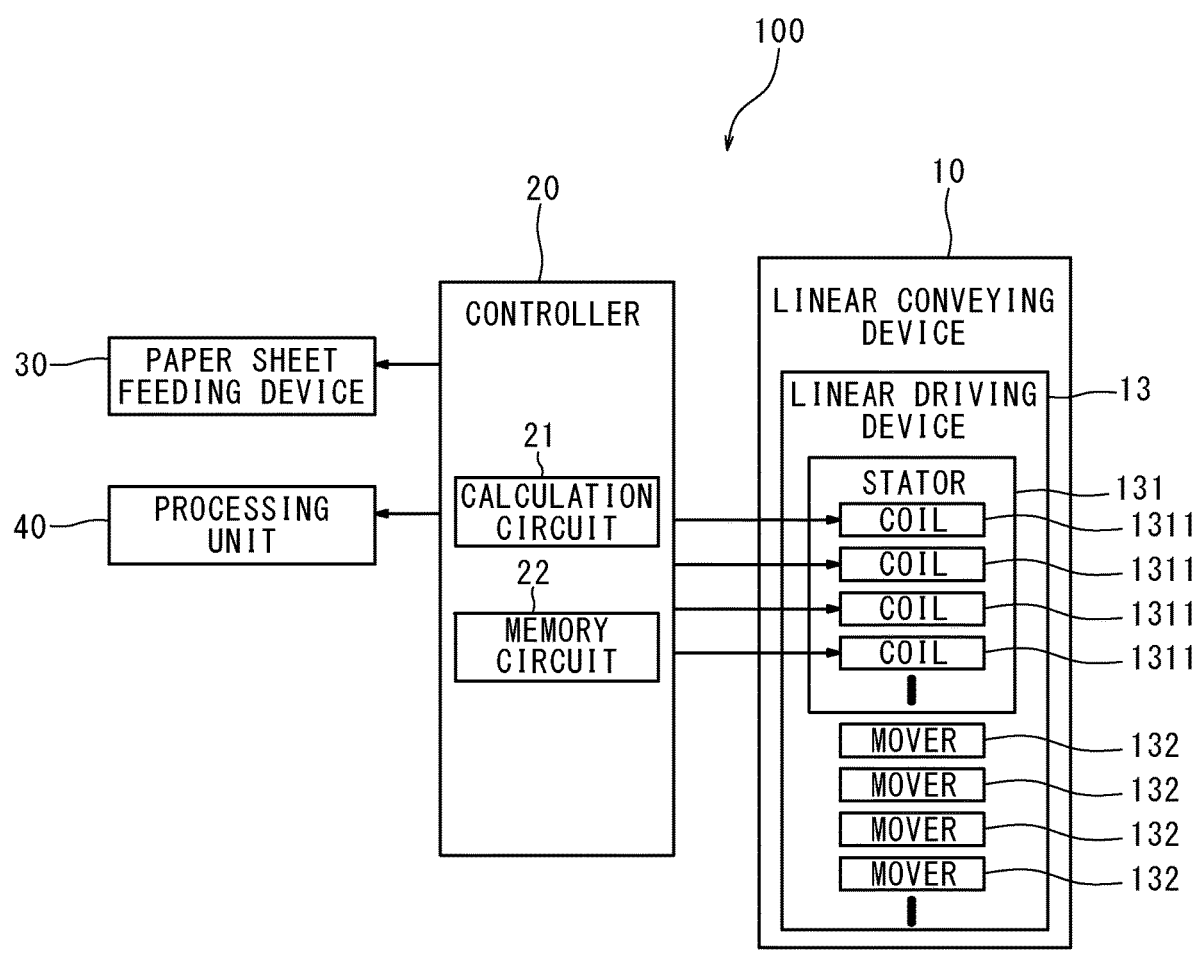
FIG. 2 is a functional block diagram of the working apparatus.

Embodiments of the present invention will be described below with reference to the accompanying drawings. FIG. 1 is a schematic diagram of a working apparatus 100 using a linear conveying device 10 according to the present invention. FIG. 2 is a functional block diagram of the working apparatus 100.

<Working Apparatus 100>

The working apparatus 100 conveys a paper sheet Ps, forms a box Bx by folding and bonding the paper sheet Ps, puts contents in the box Bx, and carries it out. In the embodiment, the box Bx has a bottom portion in a rectangular shape and side portions extending from the edges of the bottom portion respectively. The paper sheet P is formed in the shape of the box Bx as it is unfolded. As shown in FIGS. 1 and 2, the working apparatus 100 includes a linear conveying device 10, a controller 20, a paper sheet feeding device 30, and a processing device 40.

<Controller 20>

As shown in FIG. 2, the controller 20 includes an arithmetic circuit 21 and a memory circuit 22. The arithmetic circuit 21 is a circuit for processing various kinds of information and includes an arithmetic circuit such as a CPU or an MPU. The arithmetic circuit 21, based on processing results, controls the target of its control included in the linear conveying device 10, the paper sheet feeding device 30, and the processing device 40.

The memory circuit 22 is a circuit including or connected to a semiconductor memory such as a ROM and a RAM, a portable memory such as a flash memory, or a storage medium such as a hard disk. A configuration is also possible where the memory circuit 22 stores various programs such as a control program and a processing program so that, as necessary, the arithmetic circuit 21 can call and execute a program corresponding to the desired processing to perform it. The elements connected to the controller 20 and their control will be described later whenever appropriate.

<Linear Conveying Device 10>

The linear conveying device 10 conveys the box Bx (articles) using a linear motor. The linear conveying device 10 includes a guide portion 11, a plurality of shuttles 12, and a linear driving mechanism 13 (see FIG. 2). As shown in FIG. 1, the guide portion 11 is formed in a loop by coupling together opposite ends of straight rails arranged parallel to each other. The guide portion 11 includes a first straight portion 111 and a second straight portion 112 that are straight, and a first curved portion 113 and a second curved portion 114 that are curved.

As shown in FIG. 1, the first and second straight portions 111 and 112 are arranged parallel to each other. The first curved portion 113 couples together one end of the first straight portion 111 and one end of the second straight portion 112. The second curved portion 114 couples together the other end of the first straight portion 111 and the other end of the second straight portion 112. In this way, the guide portion 11 is formed in a loop by connecting together the first straight portion 111, the first curved portion 113, the second straight portion 112, and the second curved portion 114. Note that the first and second straight portions 111 and 112 need not be parallel to each other.

Figure 3:
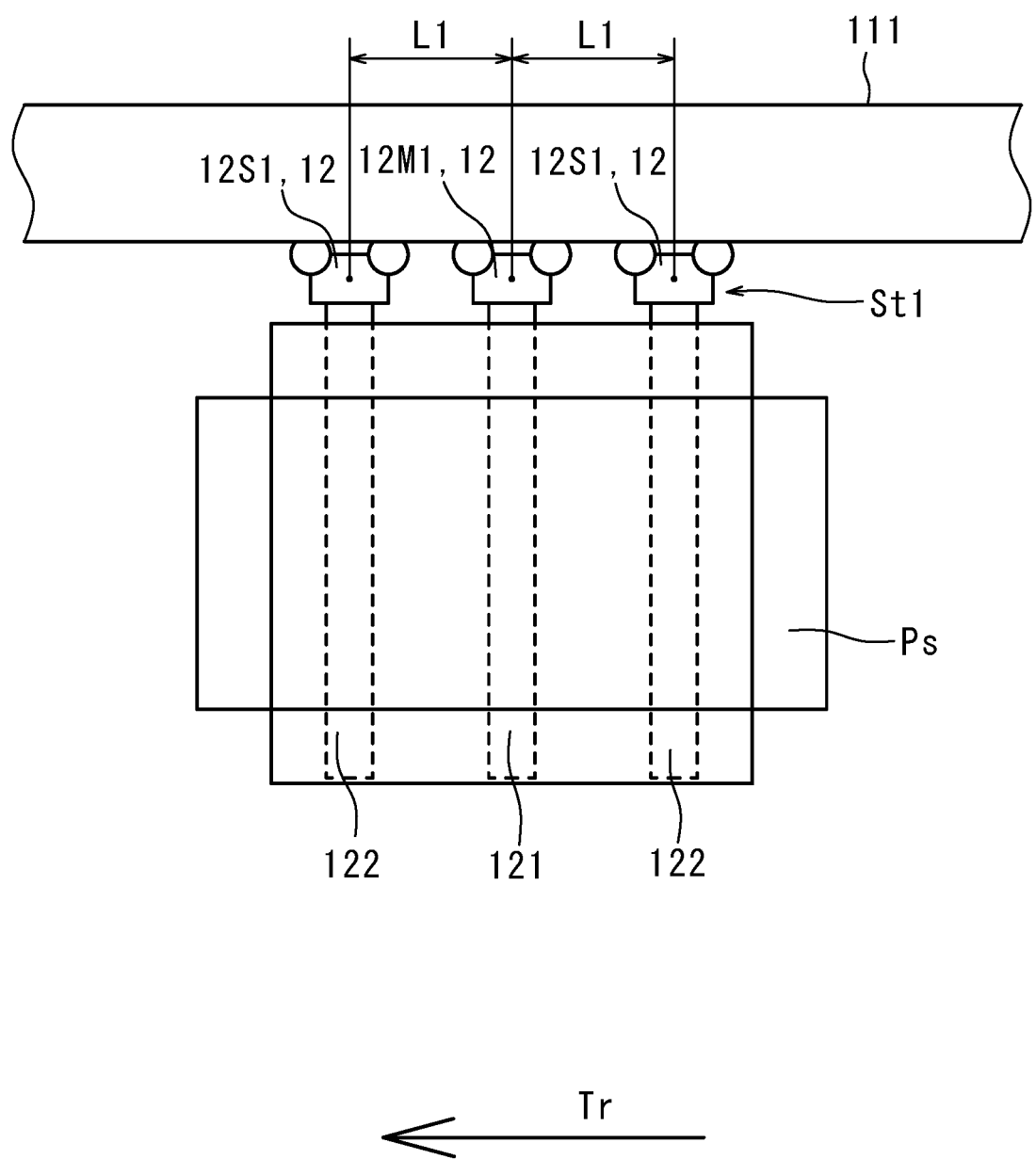
FIG. 3 is an enlarged plan view of a first operating group moving on a first straight portion.

FIG. 3 is an enlarged plan view of a first operating group moving on the first straight portion 111. A plurality of shuttles 12 are attached to the guide portion 11 that is formed in a loop. The shuttles 12 are moved along the guide portion 11 by the linear driving mechanism 13. Note that in the embodiment, the shuttles 12 are assumed to move clockwise on the guide portion 11 shown in FIG. 1. That is, the conveying direction Tr1 along the guide portion 11 shown in FIG. 1 is the clockwise direction.

As shown in FIG. 2, the linear driving mechanism 13 includes a stator 131 and a mover 132. The stator 131 is arranged on the guide portion 11. The stator 131 includes a plurality of coils 1311 arranged side by side along the guide portion 11. Each coil 1311 is connected to the controller 20. To each coil 1311, a current is supplied based on an instruction from the controller 20. The coil 1311 is excited by being supplied with the current. The linear driving mechanism 13 may include an unillustrated driver for supplying current to given coils 1311. In that case, the controller 20 transmits to the driver an instruction for operation. The driver, based on the instruction from the controller 20, supplies current to appropriate coils 1311.

Each mover 132 includes a magnet and is housed in a shuttle 12. To a plurality of coils 1311, current is supplied with predetermined timing based on the instruction from the controller 20. Thus, each coil 1311 is excited with predetermined timing. This produces a magnetic force between the coil 1311 and the magnet in the mover 132. With the magnetic force, the shuttle 12 moves along the guide portion 11.

That is, the linear driving mechanism 13, based on instructions from the controller 20, moves the shuttle 12 incorporating the mover 132. More specifically, the controller 20 can control the position of the shuttle 12 on the guide portion 11. That is, the controller 20 can control the shuttle 12 based on its position on the guide portion 11 (i.e., its absolute position).

The controller 20 can also control to adjust, for a shuttle 12 moving along the guide portion 11, its distance from another shuttle 12 (i.e., its relative position). That is, the controller 20 can also control to adjust the control-target shuttle 12 based on its relative position from a reference shuttle 12. As described thus far, the controller 20 can control the movement of a shuttle 12 based on its absolute position and also based on its relative position from another shuttle 12.

As will be described in detail later, a shuttle 12 controlled based on its absolute position is assumed to be a first master shuttle 12M1, and a shuttle 12 controlled based on its relative position to the first master shuttle 12M1 is assumed to be a first slave shuttle 12S1. Likewise, as will be described in detail later, the n-th master shuttle is identified as "12Mn", and the n-th slave shuttle is identified as "12Sn" (where n is a positive integer of two or more). In the diagrams, the first master shuttle may be marked as "12M1, 12", and the first slave shuttle as "12S1, 12".

<Paper Sheet Feeding Device 30>

The paper sheet feeding device 30 is a device for feeding paper sheets Ps. The paper sheet feeding device 30 is connected to the controller 20 (see FIG. 2). As shown in FIG. 1, the paper sheet feeding device 30 is arranged near the first straight portion 111. The paper sheet feeding device 30, based on instructions from the controller 20, feeds a paper sheet Ps to three shuttles 12 arranged side by side on the first straight portion 111. The three shuttles 12 hold the paper sheet Ps and move along the guide portion 11. Thus, the paper sheets Ps are conveyed along the guide portion 11. The three shuttles 12 convey the paper sheet Ps to the processing device 40.

<Processing Device 40>

As shown in FIG. 1, the processing device 40 is arranged near the second straight portion 112 of the guide portion 11. The processing device 40 is connected to the controller (see FIG. 2). The processing device 40 has a first processing position P1 and a second processing position P2. In the first processing position P1, the paper sheet Ps held and conveyed by the three shuttles 12 is folded and bonded so as to form a box Bx. Bonding for forming the box Bx can be done with adhesive tape or adhesive. Or, it can also be done using a fastening tool such as a stapler. Any methods that achieve firm fastening can be adopted for boding the box Bx. The box Bx is held and conveyed by the three shuttles 12.

In the second processing position P2, contents are put in the box Bx conveyed by the three shuttles 12, and then the box Bx is sealed and carried out. In the working apparatus 100 of the embodiment, contents can be, for example, rectangular parallelepiped paper containers containing a beverage, but this is not meant to be any limitation. The processing device 40, after putting a given number of paper containers in the box Bx, closes a lid and seals it by the same method as the one used for forming the box Bx.

In the linear conveying device 10, the shuttles 12 receive a paper sheet Ps from the paper sheet feeding device 30 as they move on the first straight portion 111, and the processing device 40 performs processing as the shuttles 12 pass through the second straight portion 112. After the processing device 40 carries the box Bx out, the shuttles 12 holding no box Bx move on the second curved portion 114 and return to the first straight portion 111. Thus, the second curved portion 114 also serves as a standby place for the shuttles 12.

On the linear conveying device 10, three shuttles 12 move while holding a paper sheet Ps fed from the paper sheet feeding device 30 and thereby the paper sheet Ps is conveyed. Thus, as shown in FIG. 3, of the three shuttles 12, the middle one includes a holding arm 121 for holding the paper sheet Ps. On the other hand, the shuttles 12 at opposite sides of it in the conveying direction each include an assisting arm 122 for supporting a front and a rear end part of the paper sheet Ps in the conveying direction. The assisting arms 122 are used to support the paper sheet Ps and also to fold the paper sheet Ps. On the linear conveying device 10 of the embodiment, the holding arm 121 and the assisting arms 122 have the same structure, but they may have different structures. Or, one shuttle 12 may include both a holding arm 121 and an assisting arm 122.

The holding arm 121 is fixed to the shuttle 12. Also the assisting arm 122 is fixed to the shuttle 12. Thus, in movement on the first straight portion 111, the assisting arm 122 has only to keep a predetermined distance from the holding arm 121. Accordingly, in the working apparatus 100 of the embodiment, the controller 20 recognizes three shuttles 12 as a single operating group St. An operating group St comprising a combination of shuttles 12 that can each operate alone is identified as a first operating group St1 (see FIG. 3).

The controller 20 takes, in the first operating group St1, the middle shuttle in the conveying direction Tr1 as a first master shuttle 12M1, and the shuttles at opposite sides of it as first slave shuttles 12S1. The controller 20 controls the first master shuttle 12M1 based on its position on the guide portion 11. The controller 20 controls the first slave shuttles 12S1 to keep their distance from the first master shuttle 12M1 constant. The distance between the first master shuttle 12M1 and the first slave shuttle 12S1 is one appropriate to hold the paper sheet Ps, and it is identified as a relative distance L1. The relative distance is a length between the shuttles 12 along the conveying direction Tr1 It is a rectilinear distance (see FIG. 3) when the first operating group St1 is on the first straight portion 111 or on the second straight portion 112. It is a relative distance L11 along a curved line (see FIG. 4) when the first operating group St1 is on the first curved portion 113 or on the second curved portion 114.

The controller 20 controls the movement of the first master shuttle 12M1 based on its position on the guide portion 11 and controls the movement of the first slave shuttle 12S1 to keep the relative distance L1 from the first master shuttle 12M1. In this way, the first operating group St1, while keeping the distance between the first master shuttle 12M1 and the first slave shuttle 12S1 constant, holds the paper sheet Ps and conveys it along the guide portion 11.

Figure 4:
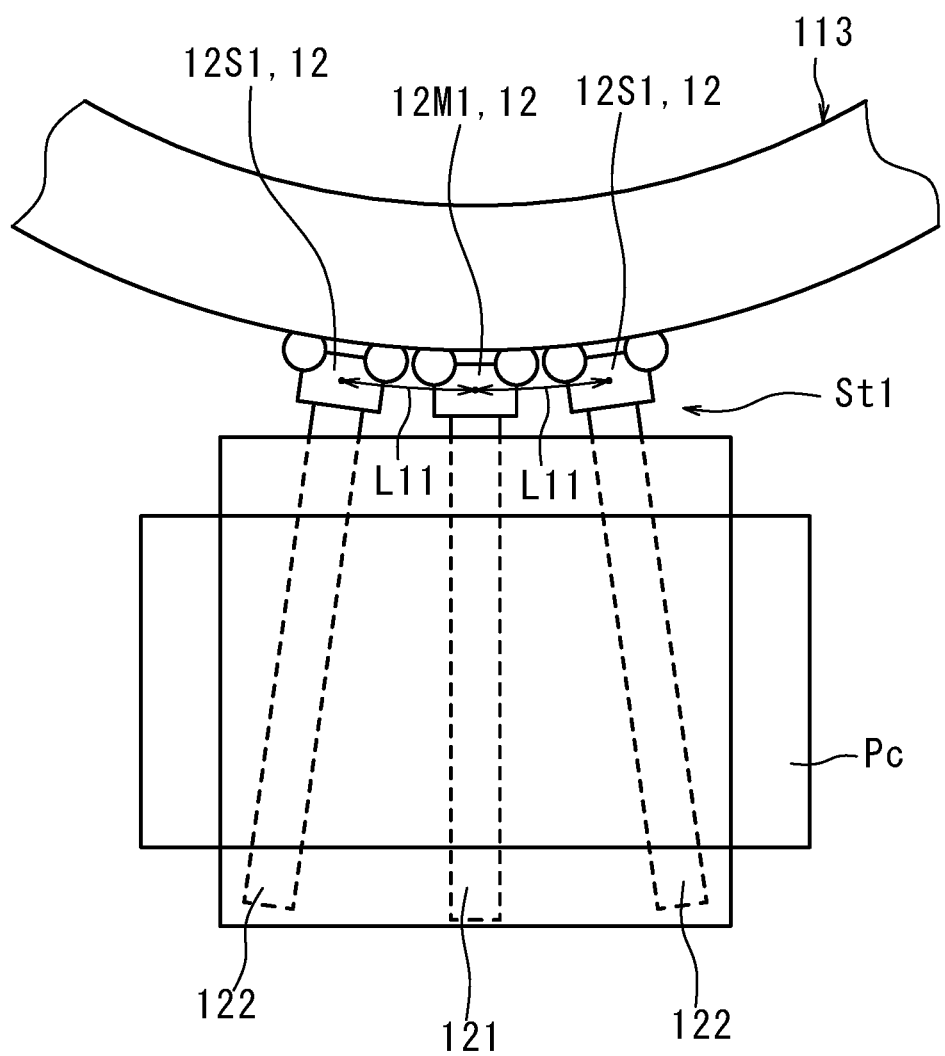
FIG. 4 is an enlarged plan view of a first operating group moving on a first curved portion.

FIG. 4 is an enlarged plan view of the first operating group St1 moving on the first curved portion 113. As described above, the holding arm 121 and the assisting arm 122 are both fixed to the shuttle 12. Thus, when the shuttles 12 reach a curved portion, the interval between them becomes larger away from the shuttles, and this can make it difficult to stably support the sheet Ps. Thus, when the first operating group St1 reaches the first curved portion 113, the controller 20 changes the relative distance of the first slave shuttle 12S1 from the first master shuttle 12M1 to a relative distance L11 (<the relative distance L1) (see FIG. 4).

In this way, it is possible to convey the paper sheet Ps stably even when the first operating group St1 moves on the first curved portion 113. The controller 20 can, when the first operating group St1 reaches the first curved portion 113, control to reduce the moving speed of the first master shuttle 12M1. In this way, it is possible to reduce the centrifugal force acting on the paper sheet Ps. The first slave shuttle 12S1 is controlled based on its relative distance from the first master shuttles 12M1. Thus, when the first master shuttle 12M1 slows down, also the first slave shuttles 12S1 slows down.

That is, the controller 20 controls only the single first master shuttle 12M1 based on the position (absolute position) on the guide portion 11. As for the first slave shuttles 12S1, the controller 20 controls to adjust (here, keep constant) the relative position from the first master shuttle 12M1. For control based on the absolute position, it is necessary to acquire the position (absolute position) on the guide portion 11 of the control target. By contrast, with the configuration where the first slave shuttles 12S1 are controlled based on its relative position from the first master shuttle 12M1, it is not necessary to acquire the position (absolute position) on the guide portion 11 of the first slave shuttles 12S1. Also for this reason, in the controller 20, combining control based on the absolute position and the relative position helps reduce processing during control compared to if all the shuttles 12 are controlled based on their absolute positions.

Through such control, the first slave shuttles 12S1 are controlled to maintain the relative distance from the first master shuttle 12M1. Thus, even if the speed of the first master shuttle 12M1 changes, the first slave shuttles 12S1 are less likely to delay greatly from the first master shuttle 12M1 when, for example, starting to move or moving over from the first straight portion 111 to the first curved portion 113. Thus, compared to if the movement of each shuttle 12 is controlled based on their position on the guide portion 11, the shuttles 12 are less likely to collide with each other.

When the first operating group St1 moves from the first curved portion 113 into the second straight portion 112, the controller 20 may change control such that the first operating group St1 keeps the speed and the relative distance L1 that it had when moving on the first straight portion 111. The controller 20 may instead control such that movement on the second straight portion 112 proceeds with the speed and the relative distance maintained from movement on the first curved portion 113.

Then, the first operating group St1 reaches the first processing position P1 on the second straight portion 112, and stops in the first processing position P1 on the second straight portion 112. In the first processing position P1, the paper sheet Ps held and conveyed by the first operating group St1 is folded and bonded by the processing device 40 so as to form a box Bx.

While the paper sheet Ps is being folded in the first processing position P1, the next first operating group St1 reaches the first processing position P1. Thus, the controller 20 controls such that, while the previous first operating group St1 is present, the next one does not collide with it. This can also be achieved by controlling the position of the first master shuttle 12M1, thus through easy control.

In the second processing position P2 on the second straight portion 112, contents are put in the box Bx. In the processing device 40, to reduce the processing duration for putting contents, three boxes Bx are arrayed in the conveying direction Tr1, and are simultaneously filled with contents and carried out. Thus, when three first operating groups St1 each supporting a box Bx formed in the first processing position P1 assemble, the controller 20 combines the three first operating groups St1 together as a second operating group St2.

Figure 5:
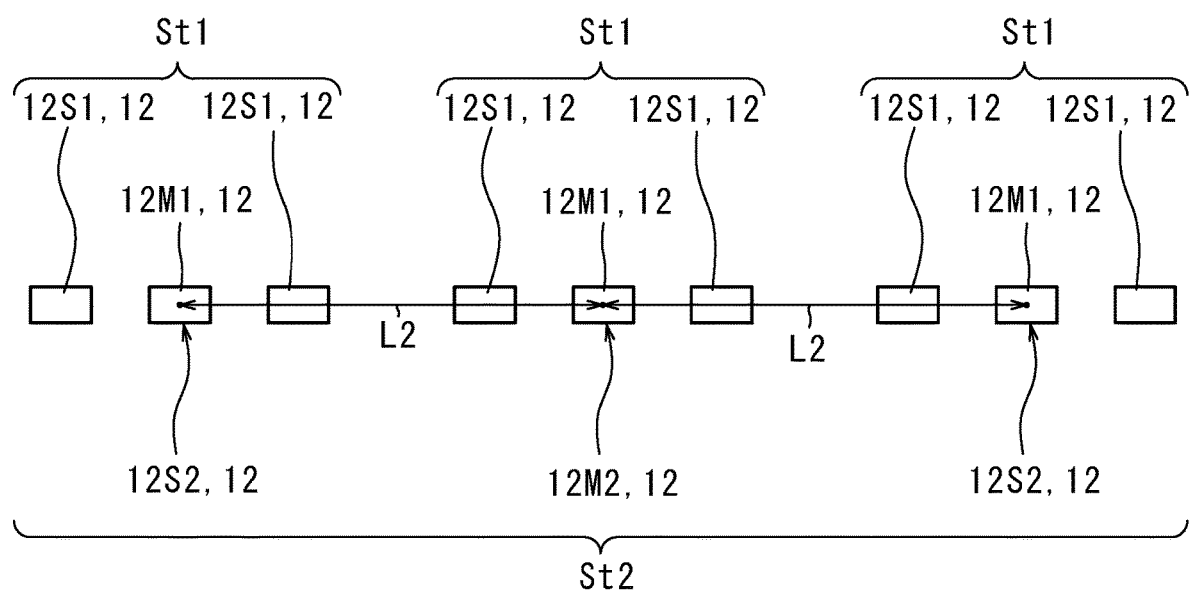
FIG. 5 is a conceptual diagram showing a second operating group St2.

FIG. 5 is a conceptual diagram showing the second operating group St2. In FIG. 5, a shuttle 12 is indicated by a rectangular symbol. As shown in FIG. 5, the second operating group St2 has three first operating groups St1. That is, nine shuttles 12 constitute the second operating group St2.

The controller 20 takes, of the first master shuttles 12M1 in each of the three first operating groups St1, the middle one as a second master shuttle 12M2. The controller 20 takes the rest (any other) of the first master shuttles 12M1 as second slave shuttles 12S2.

The controller 20 controls the movement of the second master shuttle 12M2 based on its position on the guide portion 11. The controller 20 controls the second slave shuttles 12S2 so that they move while keeping a relative distance L2 from the second master shuttle 12M2 so as to allow contents to be put in. The relative distance L2 is the same distance as in the processing mechanism used for putting contents in the processing device 40. The relative distance L2 is also a distance that is set such that adjacent first slave shuttles 12S1 between adjacent first operating groups St1 do not collide with each other.

Even when control is performed with respect to the second operating group St2, the controller 20 continues to control to adjust the relative positions of the first slave shuttles 12S1 from the first master shuttle 12M1.

In this way, the controller 20 controls the second master shuttle 12M2 and the second slave shuttles 12S2 in the second operating group St2 and can thereby control the movement of all the shuttles 12 constituting the second operating group St2.

Thus, the controller 20 controls a single shuttle 12 based on its absolute position and can thereby control all the shuttles 12 in the second operating group St2. Thus, the processing load for controlling the shuttles 12 can be reduced. The shuttles other than the single second master shuttle 12M2 are controlled based on their relative positions from the second master shuttle 12M2; thus, it is possible to move all the shuttles 12 in the second operating group St2 such that they do not collide with each other. Compared to if each shuttle 12 is controlled individually based on its position on the guide portion 11, the coordination between adjacent shuttles is less likely to be disturbed. Thus, it is possible to simplify the control and in addition to prevent shuttles from colliding with each other.

Then, the processing device 40 seals the boxes Bx having contents put in them and carries them out. Then, the shuttles 12 move in the conveying direction Tr1 to move to the second curved portion 114, and wait there for the next task.

Figure 6:
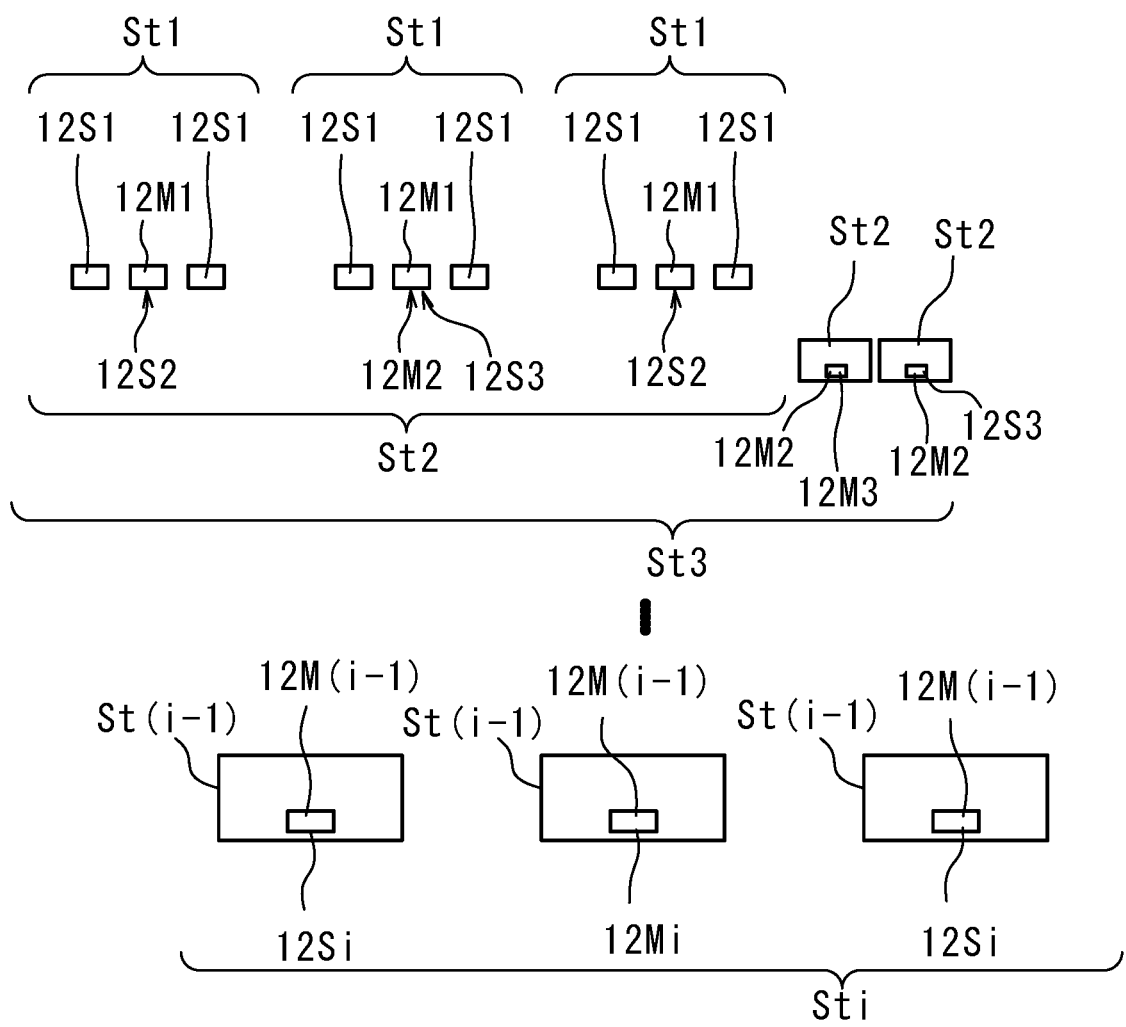
FIG. 6 is a conceptual diagram showing an i-th operating group Sti.

After the boxes Bx are removed, the controller 20 may move the second operating group St2, still as a group, to the second curved portion 114. The controller 20 may combine a plurality of second operating groups St2 together as a third operating group St3 and control movement by controlling the third operating group St3. FIG. 6 is a conceptual diagram showing an i-th operating group Sti. In FIG. 6, some operating groups are indicated by rectangular symbols. As shown in FIG. 6, the controller 20 takes one of the second master shuttles 12M2 in each of the second operating group St2 as a third master shuttle 12M3 and the rest (any other) as third slave shuttles 12S3.

The controller 20 continues to control the slave shuttles in each of the first and second operating groups St1 and St2 based on their relative positions from their master shuttles. The controller 20 controls the movement of the third master shuttle 12M3 based on its position on the guide portion 11. The controller 20 controls the movement of the third slave shuttles 12S3 so as to adjust their relative positions from the third master shuttle 12M3. Through such control, it is possible to prevent any of the shuttles from colliding with any other and to reduce processing load compared if all the shuttles 12 are controlled individually based on their positions on the guide portion 11.

In the linear conveying device 10 described thus far, the controller 20 sets the first, second, and third operating groups St1. St2, and St3 to perform control. However, this is not meant to be any limitation.

The controller 20 takes an operating group composed of a combination of a plurality of shuttles that operate individually or, in other words, that are not included in any other operating groups as the first operating group St1. The controller 20 may control movement (see FIG. 6) taking an operating group comprising a combination of a plurality of first operating groups St1 as a second operating group St2, taking an operating group comprising a combination of a plurality of second operating groups St2 as a third operating group St3, . . . , and taking an operating group comprising a combination of a plurality of (i−1)th operating groups St(i−1) as an i-th operating group Sti (i is any integer of two or more).

Here, the controller 20 continues to control to adjust the slave shuttles of the (i−1)th and subsequent orders based on their relative positions from the master shuttles of the same orders. The controller 20 controls the i-th master shuttle 12Mi based on its absolute position. At the same time, the controller 20 controls to adjust the relative position of the i-th slave shuttles 12Si from the i-th master shuttle 12Mi. Through such control, always a single shuttle (the master shuttle of the highest order at that point) alone needs to be controlled based on its absolute position; thus, the control can be simplified. The rest (any other) of the shuttles are controlled based on their relative positions from the adjacent shuttles; thus, shuttles are less likely to collide with each other.

In the embodiment, three shuttles or three operating groups are combined to constitute an operating group of a higher order, but any other number of shuttles or groups may be so combined. As long as a master-slave relationship can be established among shuttles, any number, two or more, of them can be combined.

In a case where operating groups of a plurality of (for example, k) orders are set, the controller 20 may be configured to break up the combinations of operating groups when the k-th master shuttle moves to a predetermined position on the guide portion 11. Here, for example, the controller can break up the groups into operating groups of a lower order such as (k−1), or can break up all the operating groups into individual shuttles.

In this way, it is possible to select master and slave shuttles freely depending on the number of operating groups. In the embodiment, the middle shuttle in the conveying direction Tr1 is taken as a mater shuttle, but this is not meant to be any limitation. For example, control is also possible in which the shuttle at the head or tail end in the conveying direction Tr1 is taken as a master shuttle. Or, a master shuttle can be determined so as to make the processing on the processing device 40 easy.

Modified Examples

Figure 7:
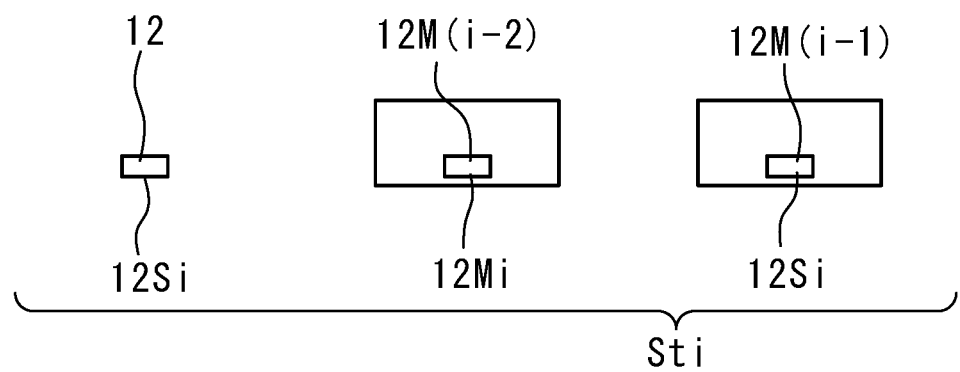
FIG. 7 is a conceptual diagram showing an i-th operating group in a modified example.

FIG. 7 is a conceptual diagram showing an i-th operating group in a modified example. In FIG. 7, a shuttle 12 is indicated by a rectangular symbol. In the i-th operating groups in FIG. 6, operating groups of the same order are combined to form an operating group of a higher order. However, this is not meant to be any limitation. As shown in FIG. 7, an independent shuttle 12, an (i−2)th operating group St(i−2), and an (i−1)th operating group St(i−1) can be combined to form an i-th operating group Sti. Also in that case, the controller 20 takes one of the independent shuttle 12 and the respective master shuttles in the operating groups of the different orders as the i-th master shuttle, and the rest (any other) as the i-th slave shuttles. With this configuration, it is possible to combine operating groups of different orders together and thereby form an operating group of a higher order; thus, the control can be simplified.

The description given above of embodiments of the present disclosure is in no way meant to limit the scope of the present disclosure; The present invention can be implemented in any other manners than as in the embodiments described above, with any modifications made without departure from the spirit of the invention.

REFERENCE SIGNS LIST

100 working apparatus
10 linear conveying device
11 guide portion
111 first straight portion
112 second straight portion
113 first curved portion
114 second curved portion
12 shuttle
121 holding arm
122 assisting arm
12M1 first master shuttle
12S1 first slave shuttle
12M2 second master shuttle
12S2 second slave shuttle
12M3 third master shuttle
12S3 third slave shuttles
12Mi i-th master shuttle
12Si i-th slave shuttle
13 linear driving mechanism
131 stator
1311 coil
132 mover
20 controller
21 calculation circuit
22 memory circuit
30 paper sheet feeding device
40 processing device

The invention claimed is:

1. A linear conveying device for conveying articles with a linear motor, comprising:
    a guide portion on which a stator of the linear motor is arranged;
    a plurality of shuttles attached to the guide portion, the shuttles each moving along the guide portion while holding an article, the shuttles each having a mover of the linear motor arranged thereon; and
    a controller for controlling operation of the plurality of shuttles, wherein
    the plurality of shuttles, at least two shuttles are combined together to form a first operating group,
    in the first operating group, one of the shuttles therein is taken as a first master shuttle and any other is taken as a first slave shuttle,
    the first master shuttle is controlled based on a position thereof on the guide portion, and
    the first slave shuttle is controlled based on a relative position thereof from the first master shuttle,
    wherein the linear conveying device further includes a plurality of (1−1)th (where i is any integer of two or more) operating groups, and
    wherein
    the (i−1)th operating groups each include one (i−1)th master shuttle and one or a plurality of (i−1)th slave shuttles,
    the (i−1)th slave shuttles are controlled based on relative positions thereof from the (i−1)th master shuttle,
    the plurality of (i−1)th operating groups, at least two (i−1)th operating groups are combined together to form an i-th operating group,
    the plurality of (i−1)th master shuttles, one is taken as an i-th master shuttle and any other is taken as an i-th slave shuttle, and
    while control of the relative positions of the (i−1)th slave shuttles from the (1−1)th master shuttle is maintained, the i-th master shuttle is controlled based on a position thereof on the guide portion, and
    the i-th slave shuttle is controlled based on a relative position thereof from the i-th master shuttle.

2. The linear conveying device according to claim 1, wherein a relative position of a k-th (where k is any integer of one or more) slave shuttle from a k-th master shuttle changes depending on a position of the k-th master shuttle on the guide portion.

3. The linear conveying device according to claim 2, wherein a combination of k-th (where k is any integer of one or more) operating groups is broken up according to the position of the k-th master shuttle on the guide portion.

4. A linear conveying device for conveying articles with a linear motor, comprising:
    a guide portion on which a stator of the linear motor is arranged;
    a plurality of shuttles attached to the guide portion, the shuttles each moving along the guide portion while holding an article, the shuttles each having a mover of the linear motor arranged thereon; and a controller for controlling operation of the plurality of shuttles, wherein the plurality of shuttles, at least two shuttles are combined together to form a first operating group, in the first operating group, one of the shuttles therein is taken as a first master shuttle and any other is taken as a first slave shuttle, the first master shuttle is controlled based on a position thereof on the guide portion, and the first slave shuttle is controlled based on a relative position thereof from the first master shuttle, wherein the linear conveying device further includes a plurality of operating groups of the (i−1)th (where i is any integer of two or more) and subsequent orders, and wherein slave shuttles of the (i−1)th and subsequent orders are controlled based on relative positions thereof from master shuttles of same orders, operating groups and single shuttles of the (i−1)th (where i is any integer of two or more) and subsequent orders, at least two are combined together to form an i-th operating group, the plurality of master shuttles or the single shuttles of the (i−1)th and subsequent orders, one is taken as an i-th master shuttle and any other is taken as an i-th slave shuttle, and while control of the relative positions of the slave shuttles of the i-th and subsequent orders from the master shuttles of the same orders is maintained, the i-th master shuttle is controlled based on a position thereof on the guide portion, and the i-th slave shuttle is controlled based on a relative position thereof from the i-th master shuttle.

5. The linear conveying device according to claim 4, wherein a relative position of a k-th (where k is any integer of one or more) slave shuttle from a k-th master shuttle changes depending on a position of the k-th master shuttle on the guide portion.

6. The linear conveying device according to claim 5, wherein a combination of k-th (where k is any integer of one or more) operating groups is broken up according to the position of the k-th master shuttle on the guide portion.

7. A method of controlling a linear conveying device for conveying articles with a linear motor, the method comprising:

forming a first operating group by combining together at least two of a plurality of shuttles that are attached to a guide portion having a stator of the linear motor arranged thereon, the shuttles each moving along the guide portion while holding an article, the shuttles each having a mover of the linear motor arranged thereon, taking, in the first operating group, one of the shuttles included therein as a first master shuttle and any other as a first slave shuttle, controlling the first master shuttle based on a position thereof on the guide portion, and controlling the first slave shuttle based on a relative position thereof from the first master shuttle, wherein the method further comprises:

setting, in a plurality of (i−1)th (where i is any integer of two or more) operating groups, one (i−1)th master shuttle and one or a plurality of (i−1)th slave shuttles, controlling the (i−1)th slave shuttles based on relative positions thereof from the (i−1)th master shuttle, combining together, of the plurality of (i−1)th operating groups, at least two (1-1)th operating groups to form an i-th operating group, taking, of the plurality of (i−1)th master shuttles, one as an i-th master shuttle and any other as an i-th slave shuttle, and while maintaining control of the relative positions of the (i−1)th slave shuttles from the (i−1)th master shuttle, controlling the i-th master shuttle based on a position thereof on the guide portion, and controlling the i-th slave shuttle based on a relative position thereof from the i-th master shuttle.

\* \* \* \* \*